(12) United States Patent
Takada

(10) Patent No.: US 9,254,721 B2
(45) Date of Patent: Feb. 9, 2016

(54) BASE TIRE AND TIRE BUILT ON BASE TIRE

(71) Applicant: BRIDGESTONE CORPORATION, Tokyo (JP)

(72) Inventor: Yukihiro Takada, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/345,349

(22) PCT Filed: Apr. 26, 2013

(86) PCT No.: PCT/JP2013/062419
§ 371 (c)(1),
(2) Date: Mar. 17, 2014

(87) PCT Pub. No.: WO2013/175940
PCT Pub. Date: Nov. 28, 2013

(65) Prior Publication Data
US 2014/0345776 A1      Nov. 27, 2014

(30) Foreign Application Priority Data

May 25, 2012   (JP) .................................. 2012-119403

(51) Int. Cl.
| | |
|---|---|
| *B60C 1/00* | (2006.01) |
| *B60C 11/00* | (2006.01) |
| *B60C 19/12* | (2006.01) |
| *B60C 11/01* | (2006.01) |
| *B60C 11/02* | (2006.01) |

(Continued)

(52) U.S. Cl.
CPC ............... *B60C 19/12* (2013.01); *B60C 1/0016* (2013.04); *B60C 9/18* (2013.01); *B60C 9/28* (2013.01); *B60C 11/005* (2013.01); *B60C 11/01* (2013.01); *B60C 11/02* (2013.01); *B60C 13/002* (2013.04); *B60C 2009/1828* (2013.04); *B60C 2011/0025* (2013.04); *B60C 2011/016* (2013.04)

(58) Field of Classification Search
CPC   B60C 11/00; B60C 11/0008; B60C 11/0041; B60C 11/005; B60C 11/0075; B60C 1/0016
See application file for complete search history.

(56) References Cited

U.S. PATENT DOCUMENTS 4,387,759 A * 6/1983 Obata et al. .................... 152/525
4,838,330 A * 6/1989 Takayama ................... 152/209.5

(Continued)

FOREIGN PATENT DOCUMENTS

JP         55-164509         12/1980
JP         U1 56-127107      9/1981

(Continued)

OTHER PUBLICATIONS

Machine translation of JP 2003-312210, 2003.*

(Continued)

*Primary Examiner* — Justin Fischer
(74) *Attorney, Agent, or Firm* — Oliff PLC

(57) ABSTRACT

Provided is a base tire securing cut resistance while retaining rolling resistance performance of the tire and a tire built on such a base tire. A base tire includes a base rubber which forms the outer periphery of the base tire to which a tread rubber is applied, a pair of mini side rubbers, each protecting the axial edge of the base rubber, and a pair of outer rubber layers, each overlapping the axially outer side of the mini side rubber.

6 Claims, 3 Drawing Sheets

(51) Int. Cl.
*B60C 13/00* (2006.01)
*B60C 9/18* (2006.01)
*B60C 9/28* (2006.01)

(56) References Cited

U.S. PATENT DOCUMENTS

2007/0084533 A1 4/2007 Numata
2010/0175800 A1* 7/2010 Nakagawa ................. 152/209.5

FOREIGN PATENT DOCUMENTS

| JP | U1 59-40105 | 3/1984 |
| JP | A 9-239865 | 9/1997 |
| JP | A 10-193472 | 7/1998 |
| JP | 2003-312210 | * 11/2003 |

OTHER PUBLICATIONS

Jun. 18, 2013 Search Report issued in International Patent Application No. PCT/JP2013/062419 (with translation).
Feb. 12, 2015 Search Report issued in European Patent Application No. EP 13 79 3208.

* cited by examiner

BASE TIRE AND TIRE BUILT ON BASE TIRE

TECHNICAL FIELD

The present invention relates to a structure of a base tire serving as the base for a tire and, more particularly, to a base tire that can improve the cut resistance of the axial edges of the outer periphery of the base tire.

BACKGROUND ART

In a known tire manufacturing method, the tread of a tire and a base tire which provides the base for the tire are fabricated separately. Then the tread is placed on the outer periphery of the base tire through the medium of an uncured bonding rubber called a cushion rubber. Then the cushion rubber is cured, thereby integrating the tread and the base tire together with the bonding rubber as the bonding layer.

The rubber part forming the outer periphery of the base tire (hereinafter referred to as base rubber) has a significant influence on the rolling resistance of a product tire having the tread bonded thereon. Accordingly, the rubber material having excellent rolling resistance properties is used for the base rubber.

However, the rubber material providing superior rolling resistance performance tends to show reduced cut resistance (resistance to cuts in the rubber that can be caused by contact with other objects). Of particular concern therefore is the drops in cut resistance of the axial edges of the base rubber. Thus, mini side rubbers made of rubber excelling in cut resistance are provided at the exposed edges of the base rubber. In this manner, the cut resistance is secured by covering and protecting the exposed edges of the base rubber.

PRIOR ART DOCUMENT

Patent Document

Patent Document 1: Japanese Unexamined Patent Application Publication No. 10-193472

SUMMARY OF THE INVENTION

Problem to be Solved by the Invention

However, placing the mini side rubbers excelling in cut resistance at each edge of the base rubber causes an increase in rolling resistance over the case without them. Particularly with tires for large trucks, buses, and other commercial vehicles, the volume of mini side rubbers used can be large, thus causing greater impact on the rolling resistance performance.

For example, as a way of preventing the increase in rolling resistance, the use of the mini side rubbers may be abandoned, and instead the edges of the base rubber may be covered and protected with the side rubbers covering the sides of the base tire by employing a rubber of superior rolling resistance properties for the side rubbers. This, however, may result in the use of a rubber softer and of better rolling resistance performance for the side rubbers than that of the mini side rubbers, thus failing to secure an adequate cut resistance.

Hence, the present invention provides a base tire and a tire incorporating it that can secure cut resistance while retaining rolling resistance performance.

Means for Solving the Problem

To solve the above-described problems, a base tire is so configured as to include a base rubber forming the outer periphery of the base tire to which a tread rubber is applied, a pair of mini side rubbers, each provided at the axial edge of the base rubber, and a pair of outer rubber layers, each provided axially outside of the mini side rubber to overlap the axially outer side of the mini side rubber. And the cut resistance of the mini side rubbers is set greater than the cut resistance of the base rubber and the outer rubber layers.

Hereinafter, the invention will be described based on preferred embodiments which do not intend to limit the scope of the claims of the present invention but exemplify the invention. All of the features and the combinations thereof described in the embodiments are not necessarily essential to the invention, and they include constructions and arrangements to be employed selectively.

BEST MODE FOR CARRYING OUT THE INVENTION

Figure 1:
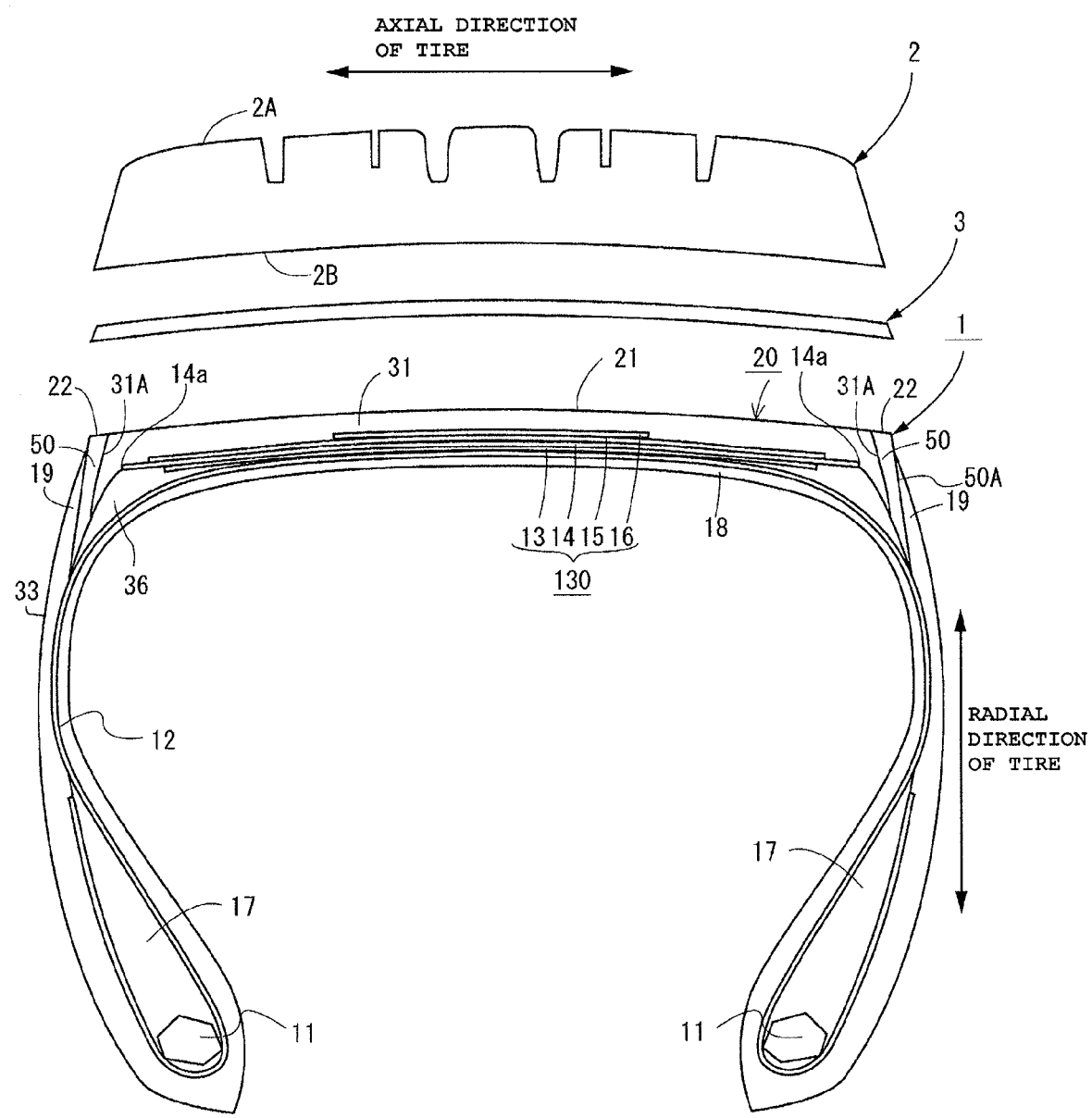
FIG. 1 is an exploded sectional view of a tire.
Figure 2:
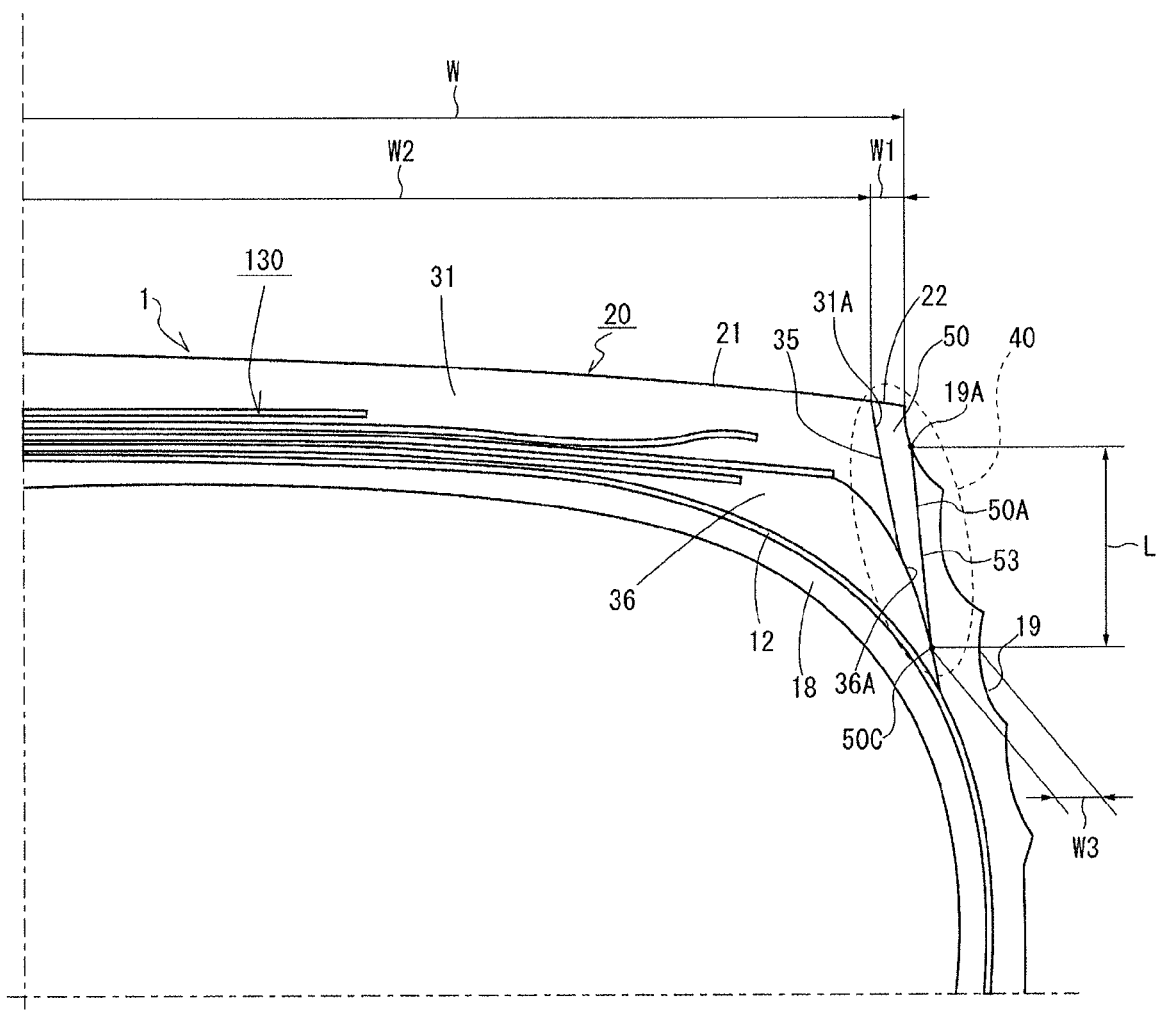
FIG. 2 is a feature sectional view of a base tire.

With reference to FIG. 1 and FIG. 2, a description is given of a structure of a base tire 1 according to a first embodiment. Note that in the cross-sectional views of FIGS. 1 and 2 and FIGS. 3 and 4 to be discussed later, no hatching is applied in order to show clear-cut boundaries between the component parts.

As shown in FIG. 1, the base tire 1 according to the present invention is a newly manufactured product to be integrated with a new tread rubber 2, which is applied (bonded) in a subsequent process, to form a tire. The base tire 1 therefore has a tread application surface 20 to which the tread rubber 2 is applied.

The tread rubber 2 to be bonded to the tread application surface 20 of the base tire 1 is formed in a band shape of a predetermined length or in a ring (annular) shape. When the tread rubber 2 is in a band shape, a tread pattern 2A is formed on one surface thereof, and an application surface 2B on the other surface thereof in opposition to the tread application surface 20 of the base tire 1. Also, when the tread rubber 2 is in a ring shape, a tread pattern 2A is formed on the outer periphery thereof, and an application surface 2B on the inner periphery thereof in opposition to the tread application surface 20 of the base tire 1.

As shown in FIG. 1, in assembling the base tire 1 and the tread rubber 2, an uncured bonding rubber 3, called a cushion rubber, is first applied to the the tread application surface 20 of an already cured base tire 1. Then an already cured tread rubber (precured tread rubber) 2 is applied over the bonding rubber 3, and the assembly in this condition is placed in a not-shown curing unit called the vulcanizer, where the bonding rubber 3 is heated at temperatures of 110 to 140° C.

And as the curing of the bonding rubber 3 progresses to a predetermined degree of curing, the base tire 1 and the tread rubber 2 are integrated with each other to form a product tire. It is to be noted, however, that the process of integrating the base tire 1 and the tread rubber 2 together is not limited to the one with the above-mentioned vulcanizer, but the arrangement may be such that an uncured tread rubber 2 is, for instance, placed on the tread application surface 20 of a cured base tire 1 and then the curing of the tread rubber 2 is performed inside the mold.

As shown in FIG. 1, the base tire 1 is comprised of a pair of bead cores 11, a carcass 12, a reinforcement layer 130, bead fillers 17, an inner liner 18, a base rubber 31 called a base tread, mini side rubbers 50, and side rubbers 19.

A pair of bead cores 11, which are shaped into rings of bundled cords, e.g., steel cords, are spaced apart from each other in the tire's axial direction. The bead cores 11 perform the function of airtightness by pressing the tire against the wheel. A carcass 12, astride the pair of bead cores 11, forms the framework of a tire, having a structure capable of withstanding the load and shocks. The reinforcement layer 130 is constituted by a group of members called belts or breakers. For example, it is constituted by a belt layer consisting of a plurality of belts 13 to 16 as shown in FIG. 1. The reinforcement layer 130 consisting of the plurality of belts 13 to 16 has a slightly arched radially outer shape when viewed in a cross section. Accordingly, the radially outer shape of the belt 16, which is located at a radially outermost position of the reinforcement layer 130, is a smooth curved surface. The smooth surface meant here refers to a surface without undulation in the axial and radial directions of the tire and has a substantially flat or arched shape in an axial cross section. For example, the belt 16 is formed such that the virtual straight line connecting the extremities of the belt 16 does not intersect with the belt 16.

The carcass 12 and the reinforcement layer 130 are each formed by winding a predetermined length of band-shaped rubber material, consisting of steel cord or the like coated with rubber, around the building drum. The bead fillers 17 are each the part reinforcing the periphery of the bead core 11. The inner liner 18 is formed of a rubber covering the inner periphery of the carcass 12. The side rubbers 19 are each a rubber covering mainly the tire side 33 portion of the carcass 12.

The tread application surface 20 of the base tire 1 has a central tread application surface 21, which is located in the middle part of the tread application surface 20 in the direction parallel to the rotation center axis of the tire (hereinafter referred to the "axial" direction of the tire), and edge tread application surfaces 22, 22, which are located at the respective edges of the central tread application surface 21 in the axial direction. The central tread application surface 21 is formed by the outer periphery of the base rubber 31 which constitutes the outer peripheral part of the base tire 1 and covers the reinforcement layer 130.

The edge tread application surfaces 22 are each the radially exposed outer periphery of the mini side rubber 50. The mini side rubbers 50, 50 each cover part of the side 36A of the below-belt cushion rubber 36, which stretches radially slantwise from the surface of the carcass 12 to the edge 14a of the widest belt 14 of the reinforcement layer 130, located at an axial extremity of the base tire, and the side 31A of the base rubber 31, which is the axial edge of the base rubber 31.

As shown in FIG. 2, the mini side rubber 50 is so disposed as to overlap the side 31A of the base rubber 31 on the axial side of the tire. The boundary surface 35 where the mini side rubber 50 and the base rubber 31 are joined together is formed as an inclined surface inclining from the radially inner side to the radially outer side toward the axial center of the tire.

At the axially outer side 50A of the mini side rubber 50, the side rubber 19 as an outer rubber layer overlapping the mini side rubber 50 is formed to cover part of the mini side rubber 50 by extending in the radially outward direction of the tire.

The side rubber 19 is formed such that the width of the radially outer edge 19A thereof is narrower than the width W3 of the axially overlapping part thereof at the radially inner end 50C of the mini side rubber 50. More specifically, the radially outer edge 19A of the side rubber 19 should be formed in a sharp angle so as to ensure its smooth joining with the axially outer side 50A of the mini side rubber 50. The boundary surface 53 where the mini side rubber 50 and the side rubber 19 are joined together is formed as an inclined surface inclining from the radially inner side to the radially outer side toward the axial center of the base tire.

As described above, the side rubber 19 has its axial width reducing toward the radially outer side, with the width thereof at the radially inner end 50C where it overlaps with the mini side rubber 50 set wider than the width thereof at the radially outer edge. Therefore, it is possible to prevent the radially outer edge 19A of the side rubber 19 located closer to the tread face from projecting in the axial direction of the tire and consequently causing the peeling of the outer rubber layer from the mini side rubber 50 as the projection hits the road surface when the vehicle runs.

Thus, in each of the buttress portions of the base tire 1, the mini side rubber 50 covers the whole area of the side 31A of the base rubber 31 from axially outside, and further the side rubber 19 covers part of the axially outer side 50A of the mini side rubber 50 from axially outside. Hence, the base rubber 31, the mini side rubber 50, and the side rubber 19 form an overlapped area 40 where they are axially overlapped with each other. Note that the buttress portion is the region below the tread application surface 20 and on the side of the reinforcement layer 130. The region therefore corresponds to the position where the overlapped area 40 is formed in this embodiment.

In this overlapped area 40, the mini side rubber 50 sandwiched between the base rubber 31 and the side rubber 19 is formed in such a wedge shape between the boundary surfaces 35 and 53 that the width W1 of the edge tread application surface 22 at the radially outer end is wider than the width of the radially inner end 50C (substantially zero in this embodiment). In other words, the mini side rubber 50 is formed with an increasingly thicker part whose axial width increases incrementally from the radially inner end 50C to the radially outer end, with the width of the radially inner end 50C set narrower than the width W1 of the edge tread application surface 22 at the radially outer end.

As described above, the mini side rubber 50 has its axial width increasing radially outward, with the width of the radially inner end 50C set narrower than the width of the radially outer end. This arrangement makes it possible to reduce the volume of the mini side rubber 50 and retain the cut resistance, which must be greater at radially outer positions, while preventing a drop in rolling resistance performance. That is, the part of the mini side rubber 50 closer to the radially inner end 50C, which is farther from the road surface when the mini side rubber 50 is incorporated into a tire, does not require much axial width. On the other hand, the part of the mini side rubber 50 closer to the radially outer end, which is closer to the road surface, requires ample width in order to retain the cut resistance. Thus, the mini side rubber 50 is so formed that its width increases radially outward, having the width of the radially inner end 50C narrower than the width of the radially outer end. As a result, it is possible to retain the cut resistance while reducing the volume of the mini side rubbers 50 to be used.

As such, the required volume of the mini side rubbers 50 is less than that of the conventional ones. And it is possible to retain the cut resistance, which must be greater in positions closer to the radially outermost tread application surface 20, while preventing a drop in rolling resistance performance.

The base rubber 31, the mini side rubbers 50, and the side rubbers 19 are made of their respective rubber materials such that the cut resistance of the mini side rubbers 50 is superior to that of the base rubber 31 and the side rubbers 19. That is, the base rubber 31, the mini side rubbers 50, and the side rubbers 19 are set to have their respective cut resistances in an relationship of "mini side rubber 50>base rubber 31" and "mini side rubber 50>side rubber 19".

The cut resistance is represented by the storage elastic modulus. In the present embodiment, the cut resistances of the base rubber 31, the mini side rubbers 50, and the side rubbers 19 are set in terms of their storage elastic moduli which are measured at a frequency of 52 Hz, an initial distortion rate of 2%, a dynamic distortion rate of 2%, and a temperature of 25° C.

More preferably, the rubber compositions of the side rubbers 19 and the base rubber 31 are set such that the relationship of the cut resistance between the base rubber 31, the mini side rubbers 50, and the side rubbers 19 is "mini side rubber 50>side rubber 19>base rubber 31". Generally speaking, the rubber with superior cut resistance tends to be harder. Therefore, if the mini side rubber 50 is provided in the whole buttress portion of the base tire to protect the side 31A of the base rubber 31 against exposure, as was practiced conventionally, then the volume of the mini side rubbers 50 will be large. Then the rolling resistance performance can be compromised even when a rubber material superior in rolling resistance properties is used for the base rubber 31. To solve this problem, a mini side rubber 50 in a down-pointing wedge shape is provided on the side 31A of the base rubber 31 as viewed in an axial cross section. Also, it is so arranged that the side rubber 19 covers part of the axially outer side 50A of the mini side rubber 50 so as to secure a predetermined axial distance from the tire side 33 of the base tire to the base rubber 31. This way, the volume of the mini side rubbers 50 can be reduced. Note that the arrangement may also be such that the side rubber 19 covers the whole of the axially outer side 50A of the mini side rubber 50.

As described above, the base tire 1 has a base rubber 31 forming the outer periphery thereof where a tread rubber 2 is applied, a pair of mini side rubbers 50, each disposed on the axial edge of the base rubber 31, and a pair of outer rubber layers, each disposed on the axially outer side of the mini side rubber 50 to overlap the axially outer side of the mini side rubber 50. And the cut resistance of the mini side rubbers 50 is set larger than that of the base rubber 31 and the outer rubber layers. Hence, it is possible to prevent a drop in rolling resistance performance of the tire while retaining the cut resistance of the buttress portion of the base tire 1 where the tread rubber 2 is applied.

Also, within the range L in which the mini side rubber 50 and the side rubber 19 as the outer rubber layer are overlapped with each other as viewed in a cross section of the base tire, it is preferred that when the axial width of the mini side rubber 50 decreases along the radially outward direction of the base tire, the width of the side rubber 19 is increased, whereas when the axial width of the mini side rubber 50 increases along the radially outward direction, the width of the side rubber 19 is decreased.

Thus, the side rubber 19 forming a side portion of the base tire 1 used as the outer rubber layer provides more of the integrity of the side portion of the base tire 1 than when the outer rubber layer is formed by a separate constituent member. This will not only prevent the outer rubber layer formed by a separate constituent member from peeling off the mini side rubber 50 or the side rubber 19, but also improve the cut resistance.

Also, the rubber compositions of the base rubber 31, the mini side rubbers 50, and the side rubbers 19 are set such that their loss tangents (tan δ) are in a relationship of "base rubber 31≥side rubber 19≥mini side rubber 50". Note that the loss tangent (tan δ) is a ratio of the storage elastic modulus to the loss elastic modulus of a rubber member, indicating how much energy the material absorbs when it deforms (heat buildup). And the smaller the value, the smaller the heat buildup and the hysteresis loss will be. In the present embodiment, the loss tangents (tan δ) of the rubber materials constituting the the base rubber 31, the mini side rubbers 50, and the side rubbers 19 are ones that were measured at a frequency of 52 Hz, an initial distortion rate of 2%, a dynamic distortion rate of 2%, and a temperature of 25° C.

Therefore, by setting the rubber compositions of the base rubber 31, the mini side rubbers 50, and the side rubbers 19 such that their loss tangents (tan δ) are in a relationship of "base rubber 31≥side rubber 19≥mini side rubber 50", a base tire excelling in rolling resistance performance can be produced without a drop in the rolling resistance performance even when the side rubbers 19 and the mini side rubbers 50 are added to protect the edges of the base rubber 31.

Also, the sum of the widths W1 of mini side rubbers 50 on both axial sides is set to be less than 20% of the total of the sum of the widths W1 of mini side rubbers 50 on both axial sides and the width W2 of the base rubber 31. In other words, the sum of the widths W1 of mini side rubbers 50 on both axial sides is set to be 20% of the total width W of the tread application surface 20. The relationship between those widths is therefore "W×20%≥W1×2". Thus, by setting the width W1 of the mini side rubber 50 as described above, it is possible to prevent any rise in rolling resistance while retaining the cut resistance.

The thickness dimension of the base rubber 31 from the outer periphery of the reinforcement layer 130 to the tread application surface 20 or the thickness dimension of the base rubber 31 from the outer periphery of the below-belt cushion rubber 36 to the tread application surface 20 is set at 1 mm or more, for instance.

Next, a description is given of a method for forming (molding) a base tire 1.

First, an uncured sheet of inner liner rubber to be an inner liner 18 is wound around a cylindrical building drum, and an uncured sheet of carcass member to be a carcass 12 is wound around the inner liner rubber.

Then bead cores 11 and bead fillers 17 are fitted to the peripheral edge areas of the carcass member from both sides of the building drum, and the edge areas of the carcass member are turned up so as to wrap up the bead fillers 17, thereby forming the bead regions.

After this, a swelling means built into the building drum is operated to have the axial center part of the stacked members swell out to form a toroidal shape, and then below-belt cushion rubbers 36 are wound around along the axial end portions of the carcass member.

Then a reinforcement layer 130 is formed by winding a plurality of band-shaped uncured belts around the outer periphery of the carcass member along the most swelled-out middle portion thereof. Next, a band-shaped uncured base rubber 31 called the base tread, which is wider than the reinforcement layer 130, is wound around in a layer over the reinforcement layer 130. Then mini side rubbers 50 are wound around along the axial edges of the base rubber 31.

Further, side rubbers 19 are wound around in such a manner as to provide a predetermined overlap on the mini side rubbers 50, thereby forming a green base tire prior to cure-molding. This green base tire is subjected to a cure-molding by use of a dedicated mold for the cure-molding of a base tire. The mold for forming the outer periphery of the base tire where the tread rubber is applied has a smooth curved forming surface without any raised ans recessed parts unlike the one used in the ordinary tire building in which the base tire and the tread rubber are integrated with each other in the cure-molding. That is, the reinforcement layer 130 consisting of a plurality of belts 13 to 16 is formed in a slightly arched smooth surface without any undulation in the radially outermost profile in a cross section because no force from the uneven forming surface of the mold used in the conventional tire building works on the tread periphery of the base tire which serves as the tread application surface 20.

As shown in FIG. 1, the base tire 1 cure-molded as described above has a reinforcement layer 130 with a smooth surface without undulation in the radially outermost profile of the belt 16 located at an outermost position of the reinforcement layer 130 in an axial cross section. As a result, no irregular wear will occur when the base tire 1 bonded with the tread rubber 2 in a subsequent process is used as a tire.

In other words, in the cure-molding of the base tire 1, there is no need to form raised and recessed parts as a pattern in the tread. Thus, no undue force works on the reinforcement layer 130 at the time of molding the base tire 1. In the conventional tire building method, when the base tire 1 and the tread are cure-molded into a single body, the belt gets undulated because of the raised and recessed parts of the mold for forming the tread. Yet, the belt, which has a tension of its own as a constituent member within the molded tire interior, retains a force to regain the linear state by canceling out the undulation. And this tendency can be a cause of irregular wear in the tread. In contrast to this, the arrangement of the present invention is such that the reinforcement layer 130 retains its smooth shape as originally designed in the cure-molding of the base tire 1. Without the undulation of the belts 13 to 16, therefore, there will be no concern about irregular wear when the base tire 1, with the tread rubber 2 applied thereto in a subsequent process, is used as a tire.

Figure 3:
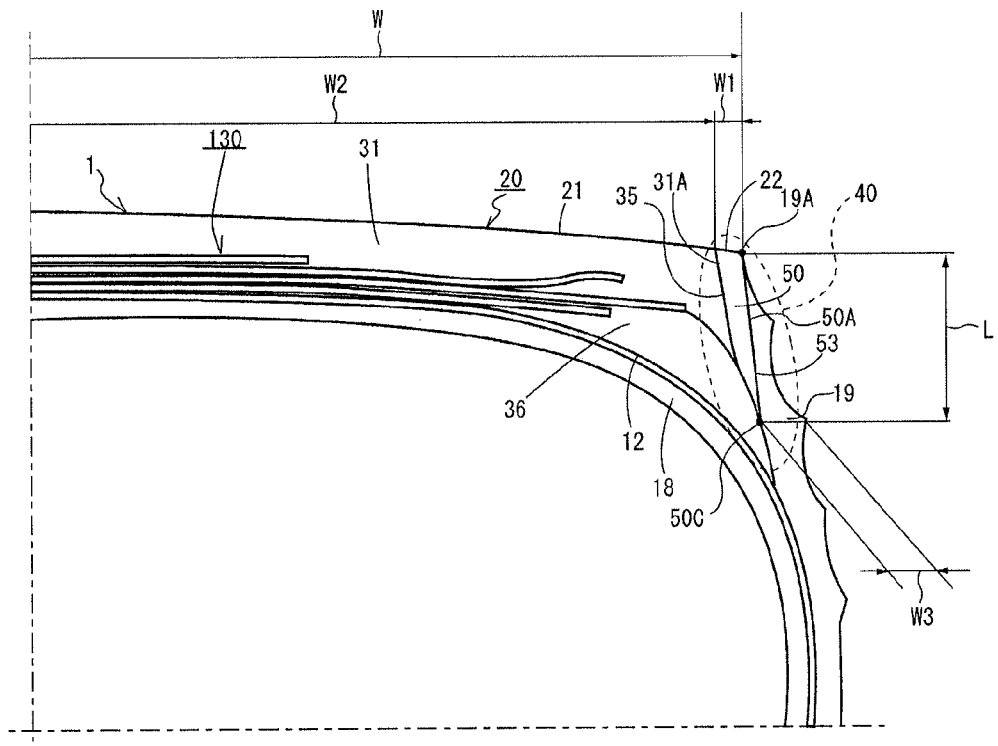
FIG. 3 is a feature sectional view showing another embodiment of a base tire.

FIG. 3 is a diagram showing another embodiment of the outer rubber layer overlapping the mini side rubber 50.

As shown in the figure, the side rubber 19 serving as the outer rubber layer is of such shape that the boundary surface 53 thereof on the mini side rubber 50 terminates at the edge of the tread application surface 20 and the terminating width is nearly zero. That is, the base tire may be arranged such that the whole of the axially outer side of the mini side rubber 50 is covered with the side rubber 19.

Figure 4:
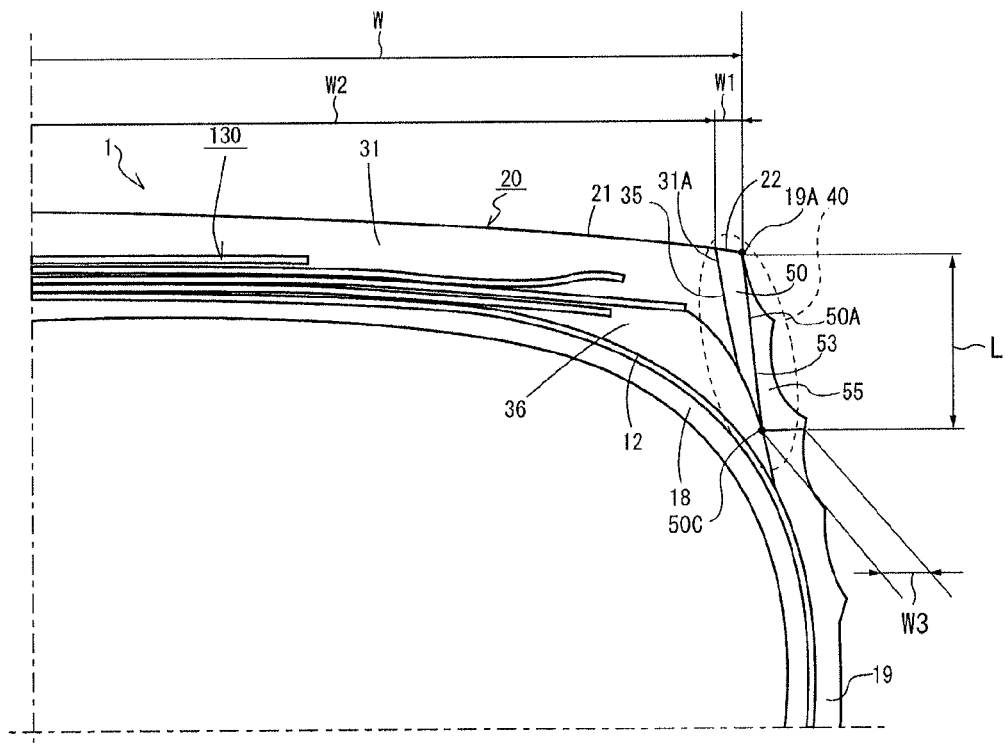
FIG. 4 is a feature sectional view showing still another embodiment of a base tire.

FIG. 4 is a diagram showing another embodiment of the outer rubber layer that protects the edge of the base rubber in overlap with the mini side rubber 50.

In the foregoing embodiments, the outer rubber layer has been described as the side rubber 19. Yet, the arrangement may be such that, as shown in FIG. 4, the outer rubber layer is a rubber member 55 different from the side rubber 19 or the mini side rubber 50, which overlaps the mini side rubber 50 from axially outside. In this case, the rubber member 55 may be so constructed as to overlap the mini side rubber 50 from the radially inner to the radially outer end thereof as shown in the figure.

Also, the arrangement may be such that the side rubber 19 overlaps part of the mini side rubber 50 on the radially inner end side and the rubber member 55 protects the part thereof on the radially outer side.

However, the rubber member 55 should be so disposed as to be integrated with the radially outer end of the side rubber 19 to form the tire side 33, thereby preventing the peeling of the rubber member 55 from the mini side rubber 50 or the side rubber 19.

Now a bonding rubber 3 and a tread rubber 2 as the cap rubber are applied to the tread application surface 20 which is the outer periphery of the base rubber 31 of the base tire 1 so far described. The base tire 1 is, for instance, of such constitution that the cut resistances of the mini side rubbers 50, the base rubber 31, and the outer rubber layers are set in a relationship of "mini side rubber 50>outer rubber layer>base rubber 31". Thus the cut resistance of the outer rubber layers is set greater than the cut resistance of the base rubber 31, which will prevent cuts made by objects coming into contact with the outer rubber layers from reaching the base rubber 31 beyond the outer rubber layer. This will surely secure the cut resistance of the tire for the base rubber. The tread rubber 2 to be used is such that the cut resistance thereof is set in a relationship of "mini side rubber 50>tread rubber 2>base rubber 31". Preferably, the tread rubber 2 whose cut resistance is set greater than the cut resistance of the outer rubber layers is used. This will create a tire superior in both cut resistance and rolling resistance performance in a well-balanced manner. If the cut resistance of the tread rubber 2 is set greater than the cut resistance of the outer rubber layers, then it will be possible to protect the base rubber 31 with a tread rubber 2 which is the most vulnerable to cut damage from the road surface. As a result, the tire as a whole will prove to be superior in both cut resistance and rolling resistance performance. Also, the cut resistance of the mini side rubber 50 set greater than the cut resistance of the tread rubber 2 will prevent the progress of a cut from the mini side rubber 50 side toward the tread rubber 2. And the cut resistance of the tread rubber 2 set greater than the cut resistance of the base rubber 31 will prevent the progress of a cut from the tread rubber 2 toward the base rubber 31. This will create a tire not only superior in cut resistance but also superior in rolling resistance performance.

Moreover, the tread rubber 2 is placed via the base rubber 31 on the reinforcement layer 130 with the belt 16 located at an outermost position whose radially outer profile in an axial cross section is formed smooth. Therefore, without the undulation of the belt, which can result under pressure of the mold with raised and recessed parts as in a conventional tire building, there will be no concern about irregular wear when the tire is used.

Also, the base tire 1 in the foregoing embodiments has been described as having a tread application surface 20. But the arrangement may be such that the base rubber 31 and the mini side rubbers 50 are buffed into a predetermined shape to create a tread application surface 20. Or the arrangement may be such that the tread application surface 20 is molded into a predetermined shape in advance, and then a protective layer is provided to protect the tread application surface 20 and the protective layer is removed in the process of integrating the base tire with the tread rubber 2.

Description of Reference Numerals 1 base tire
2 tread rubber
3 bonding rubber
13-16 belt
19 side rubber
20 tread application surface
31 base rubber
35, 53 boundary surface
36 below-belt cushion rubber 40 overlapped area
50 mini side rubber

The invention claimed is:

1. The base tire comprising:
a base rubber forming an outer periphery of the base tire to which a tread rubber is applied;
a pair of mini side rubbers, each provided at an axial edge of the base rubber; and
a pair of outer rubber layers, each provided axially outside of a corresponding one of the mini side rubbers, each outer rubber layer overlapping an axially outer side of the corresponding mini side rubber,
wherein:
a cut resistance of the mini side rubbers is set greater than a cut resistance of the base rubber and a cut resistance of the outer rubber layers, and
loss tangents (tan δ) of rubber materials consisting the base rubber, the mini side rubbers and the outer rubber layers are set in a relationship of "base rubber≥outer rubber layer≥mini side rubber".

2. The base tire according to claim 1, wherein the outer rubber layers are each a side rubber forming a side portion of the base tire.

3. A tire comprising:
a base rubber;
a pair of mini side rubbers, each provided at the axial edge of the base rubber;
a pair of outer rubber layers, each provided axially outside of a corresponding one of the mini side rubbers, each outer rubber layer overlapping an axially outer side of the corresponding mini side rubber; and
a cap rubber disposed radially outside of the base rubber,
wherein:
the cut resistances of the mini side rubbers, the base rubber, and the outer rubber layers are set in a relationship of "mini side rubber>outer rubber layer>base rubber",
the outer rubber layers are arranged so that they do not overlap the cap rubber, and
each of the mini side rubbers is configured so that it is widest at its radially outermost end.

4. The tire according to claim 3, wherein the cut resistance of the cap rubber is set greater than the cut resistance of the outer rubber layers.

5. The tire according to claim 3, wherein the radially outer profile of the axial cross section of a belt located at an outermost position of a belt layer disposed radially inside of the base rubber is smooth.

6. A tire comprising:
a base rubber;
a pair of mini side rubbers, each provided at the axial edge of the base rubber; and
a pair of outer rubber layers, each provided axially outside of the mini side rubber to overlap the axially outer side of the mini side rubber,
wherein:
the cut resistances of the mini side rubbers, the base rubber, and the outer rubber layers are set in a relationship of "mini side rubber>outer rubber layer>base rubber"; and
a cap rubber is disposed radially outside of the base rubber, the cut resistance of the cap rubber being set in a relationship of "mini side rubber>cap rubber>base rubber".

* * * * *